(12) United States Patent
Hafer, Jr.

(10) Patent No.: US 6,448,924 B1
(45) Date of Patent: Sep. 10, 2002

(54) MICROWAVE BLADE TRACKER

(75) Inventor: John W. Hafer, Jr., San Diego, CA (US)

(73) Assignee: Smiths Aerospace, Inc., Grand Rapids, MI (US)

(*) Notice: Subject to any disclaimer, the term of this patent is extended or adjusted under 35 U.S.C. 154(b) by 0 days.

(21) Appl. No.: 09/417,149

(22) Filed: Oct. 12, 1999

(51) Int. Cl.[7] .................. G01S 13/56; G01S 13/08; G01S 13/04

(52) U.S. Cl. .................. 342/28; 342/27; 342/118; 342/195

(58) Field of Search .................. 342/27, 28, 61, 342/73, 74, 81, 82, 83, 84, 88, 89, 94, 98, 99, 102, 118, 159, 165, 173, 174, 175, 195, 21; 340/561; 343/700 MS

(56) References Cited

U.S. PATENT DOCUMENTS

| | | | |
|---|---|---|---|
| 2,552,739 A | 5/1951 | Roberts | |
| 2,913,700 A | 11/1959 | Brody | |
| 3,023,317 A | 2/1962 | Willits et al. | |
| 3,121,230 A | * 2/1964 | Brueckmann | 343/700 MS X |
| 3,386,031 A | 5/1968 | Able et al. | |
| 3,524,354 A | 8/1970 | Frank et al. | |
| 3,599,197 A | * 8/1971 | Boyko | 340/561 |
| 3,866,859 A | 2/1975 | Hill | |
| 4,053,123 A | 10/1977 | Chadwick | |
| 4,465,367 A | 8/1984 | Sabatier | |
| 4,531,408 A | 7/1985 | Chadwick et al. | |
| 4,660,048 A | * 4/1987 | Doyle | 343/700 MS |
| 4,812,643 A | 3/1989 | Talbot | |
| 5,001,492 A | * 3/1991 | Shapiro et al. | 343/700 MS |
| 5,671,051 A | 9/1997 | Wright, Jr. | |

FOREIGN PATENT DOCUMENTS

| | | |
|---|---|---|
| GB | 1116748 | 6/1968 |
| GB | 1143339 | 2/1969 |
| GB | 2055269 | 2/1981 |

OTHER PUBLICATIONS

Nagy, P.B. amd Greguss, P., *Helicopter Blade Tracking by Laser Light*, Optics and Laser Technology, Dec. 1982, pp. 299–302, 1982 Butterworth & Co (Publishers) Ltd.

Nagy, Peter B., *Measurement of Conic Running with Laser Light*, Mérés és Automatika 30, 1982, No. 3, pp. 102–106, (In Hungarian Without English Translation).

* cited by examiner

Primary Examiner—Bernarr E. Gregory
(74) Attorney, Agent, or Firm—Varnum, Riddering, Schmidt & Howlett LLP

(57) ABSTRACT

Blade tracker apparatus for tracking rotating helicopter blades includes an antenna which transmits a signal beam in the direction of the rotating blade. The impedance of the antenna changes as one of the blades enters the transmission beam and the amount by which the impedance changes varies as a function of the physical distance between the antenna and the blade. The varying impedance caused by a blade passing the antenna will amplitude modulate the transmitted signal and provide an indication of the distance of each of the several blades of a rotor as each of the blades passes through the field of the antenna.

18 Claims, 4 Drawing Sheets

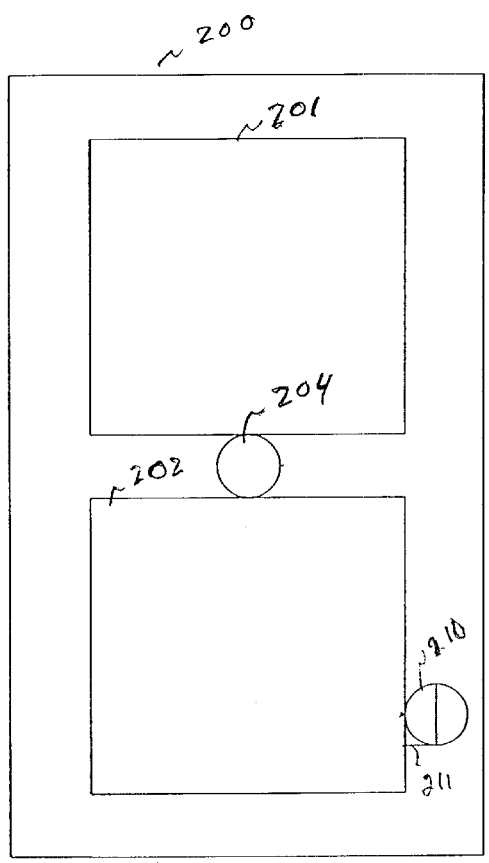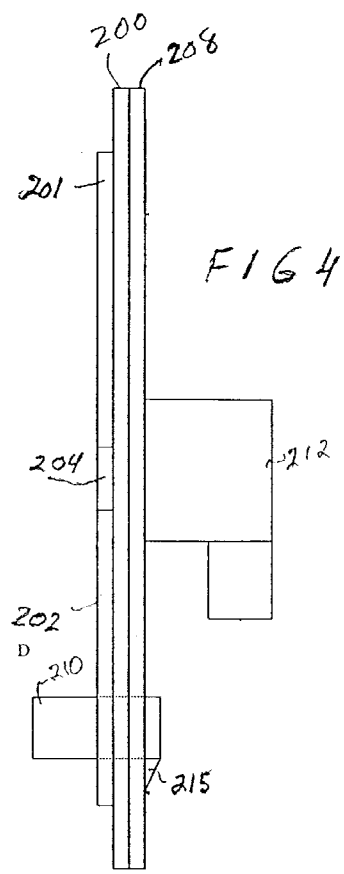

MICROWAVE BLADE TRACKER

BACKGROUND OF THE INVENTION

1. Field of the Invention

The invention relates to method and apparatus for sensing the presence of a moving object and for generating outputs indicative of the path of travel of moving objects and more particularly to method and apparatus for sensing the presence and/or relative position of a rotating fan blade or helicopter blade.

2. Background Art

It is well known that vibration resulting from rotating objects are often detrimental. Both military and commercial rotorcraft operators wage a continual battle against vibration, both to extend the life of the rotorcraft and to enhance the comfort of the crew and passengers. The rotor itself is a principal contributor to vibration. However, rotor vibration can be reduced through proper balancing of the rotor blades. Various devices have been developed and sold over the last several decades to provide the information required to accurately and efficiently balance a rotor. The more accurate and efficient rotor track and balance systems incorporate a blade tracking device to measure blade height and lead/lag between the respective blades of the rotor. Measurements of these blade parameters may be used in a balancing algorithm to generate indicia representing recommended changes in blade adjustments in order to minimize vibration. In addition, blade tracking information is required in an over-all rotorcraft tuning algorithm and for the successful completion of various required maintenance actions.

In order to reduce damage to the engine, transmission, and airframe caused by the vibration of helicopter blades, it is important that all blades of a rotor travel in the same plane and that all blades rotate with a fixed angular separation. To detect that the several blades of a helicopter rotor or the like travel in the same plane, it is a common practice to measure the distant of each of the blades from a fixed point on the craft when the blades are in predefined position relative to the fixed point. Prior art blade tracking systems primarily use strobe lights and optical sensors which measure light reflected from the rotating blades to determine the relative position of the moving blades. Some blade tracking systems have used electrostatic sensing probes or radiation, whereby a lens focuses a beam of radiation in a plane and the sensing probes detect the presence of an object as it passes through the radiation beam. Other prior art systems employ an oscillator connected to a large capacitive element positioned adjacent the plane of rotation of the blades of a rotor. In such a system, blade tracking measurements are derived from frequency modulations, resulting from a change in capacitance, and displayed on an oscilloscope.

A general problem with tracking devices known from the prior art is the lack of accuracy of the generated output signals. Prior art tracking devices using electrostatic probes are prone to error due to undefined static sources and electrostatic changes in the atmosphere which may influence accuracy of any static electricity detectors. Most earlier blade tracking systems, including those systems relying on change in capacitance, typically measure the position of the several blades of a propeller while the craft is on the ground. However, it is highly desirable that improper tracking be detected in flight, since blade dynamics vary based on engine speed and load. Commonly used tracking devices which rely on reflected optical signals are generally inaccurate because of interference due to ambient light and cannot be used at night unless the blades are artificially illuminated. In addition, reflective tape is commonly required on the blades. Furthermore, optical tracking systems tend to be sensitive to color. On helicopter rotors, color may vary from blade to blade and is often white or shades of gray. Optical sensors have been known to be incorrectly triggered by rotor shadows and to be sensitive to varying ultraviolet light levels across the zenith.

Known optical devices detect the passage of rotor blades through their field of view and generate pulse edges as each rotor blade enters and leave the optical sensing region. The path of the rotating blade is detected by using two such optical devices, such that their corresponding optical sensors are separated by a known angle. Precise time measurements of the pulse edges detected at the two optical sensing regions, coupled with rotor speed and installation parameters, allow blade height to be calculated. Synchronized timer circuits are used to identify the time that each blade enters or leaves the optical sensing region of each sensor. A once-per-revolution timing pulse is simultaneously measured to provide both rotational phase and rate information. Specifically, what is measured is the time at which the rotor blade enters the field of view and leaves the field of view of each of the two sensors. Based on this information and using well-known geometric equations, the track height of the rotor blade can be readily determined in a well-known fashion. Furthermore, the actual blade angular velocity can be calculated as well. The accuracy of blade velocity calculations is determined, in large measure, by the ability to accurately identify both leading and trailing blade edges of the blades as they pass through a measurement space. One of the problems with prior art optical systems is the inability of the track sensors to properly respond to light level changes as the blades enter and leave their fields of view. This problem is often aggravated by differences in paint and/or paint erosion on the several blades, which further tends to affect the accuracy of the blade height calculations.

Radio frequency or microwave devices such as the well-known Doppler or pulsed radar systems have commonly be(n used as locating and tracking devices. However, known radar devices such as Doppler radar depends on change in frequency and uses complex circuitry to measure changes in transmit frequency. Pulsed radar typically can be used effectively only when the distance between the source and the target is greater than 100 meters and is therefor not suited for use as a helicopter blade tracking device, where the tracking device may have to be mounted approximately one meter from the track of the rotor blades.

SUMMARY OF THE INVENTION

These and other problems of the prior art are overcome in accordance with the present invention by means of tracking apparatus comprising a radiating antenna having a predefined antenna impedance and detection circuitry for detecting deviation in antenna impedance resulting from movement of an object within the field of radiation of the antenna. Advantageously, the antenna may be positioned in close proximity to the projected path of a moving object, e.g. at a distance of on the order of one meter or less.

In accordance with one aspect of the invention, the tracking apparatus is used in a system for tracking the several blades of a helicopter rotor and the antenna is directed toward the path of travel of the rotor blades. A signal source connected to the antenna transmits radio frequency signals to the antenna, causing the antenna to radiate an electromagnetic field in the path of the helicopter rotor blades. Signal detection circuitry, connected to the antenna, provides an output signal when an a change in antenna impedance occurs due to the entry of a rotor blade in the field of the antenna. A computation of distance of each blade from the antenna is derived in a standard fashion to provide a measure of tracking of the rotor blades.

In a specific embodiment of the invention, a radio frequency (RF) generator connected to the antenna provides a continuous wave unmodulated signal. As a moving blade enters the beam, it causes a change in the antenna field impedance, resulting in a modulation of the transmitted signal. The modulated signal is received by the antenna and is detected and amplified by circuitry connected to the antenna.

Advantageously, the tracking arrangement of the present invention comprises a compact antenna structure consisting of printed circuit boards which are readily and unobtrusively mounted.

In a particular embodiment of the invention, a tracking arrangement comprises a pair of spaced apart antennas, each connected to a circuit arrangement including a signal source and circuitry of the present invention for detection of change in impedance, whereby distance of a moving object from a predetermined location may be computed from signals indicative of time of detection at the spaced apart antennas.

In accordance with one aspect of the present invention, a signal source transmits an RF signal to an antenna, directed toward the path of an object to be detected, causing the antenna to radiate an electromagnetic field in the direction of the path of the object. The antenna preferably has a well predefined antenna impedance resulting in a well defined return loss. As the object passes through the electromagnetic field of the antenna, the impedance of the antenna changes, resulting in a change in the return loss. Effectively, movement of the object through the antenna field causes an amplitude-modulation of the carrier signal. In addition to causing a change in the amplitude of the return signal, the moving object also causes a change in the phase of the return signal with respect to the transmitted signal, resulting in a phase modulation.

Advantageously, the blade tracking device in accordance with the invention acts as a motion detector which is sensitive to change in distance between the antenna and the moving objects.

Advantageously, the detector device of the present invention is not sensitive to light and can be used in bright sunlight as well as in darkness. Neither do clouds, nor fog, nor the color of the items being tracked have any effect on the measurements obtained by the tracking device of this invention. Furthermore, the antenna detector device of the present invention is small and may be housed in a standard radome capable of withstanding normal environmental changes such as moisture, sand, dust, and dirt as well as vibration and shock or exposure to manmade corrosives such as fuels and lubricants.

BRIEF DESCRIPTION OF THE DRAWINGS

FIG. 3 is a top elevational view of a printed circuit board supporting an antenna in accordance with the invention for use with the circuitry of FIG. 1;

FIG. 4 is a right side elevational view of the circuit board of FIG. 3.

DETAILED DESCRIPTION

Figure 1:
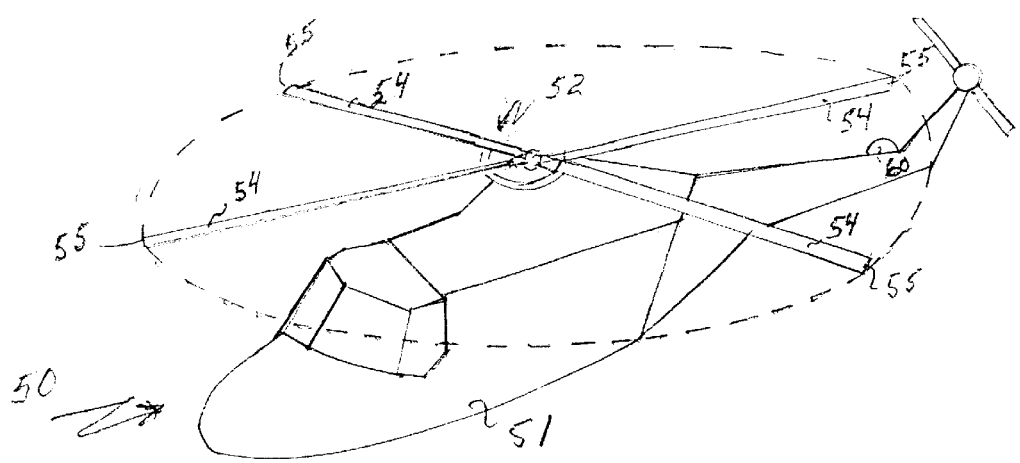
FIG. 1 is a perspective view of a helicopter having a blade tracking antenna mounted thereon.

FIG. 1 shows a helicopter 50 having a fuselage 51 and a rotor 52. The rotor is provided with a plurality of rotor blades 54, each having a rotor tip 55. A radome antenna housing 60 containing a blade tracker antenna for sensing the rotor blades 54 is mounted to the fuselage 51 in an area of the fuselage preferably in substantial alignment with the path followed by the tips 55 of rotor blade 54 when the rotor is activated. Further, shown in FIG. 1 is tail rotor 59 and a radome antenna housing 61 containing a blade tracker antenna for sensing the blades of the rotor 59. As is described further later herein, the blade tracker antenna comprises a flat plate antenna connected to signal transmission and signal receiving circuitry. The antenna continuously transmits an RF signal in the direction of the path of the rotor blades. Changes in impedance of the antenna caused by a rotor blade passing through the field of the antenna are detected by detection circuitry, not shown in FIG. 1. The circuitry senses the impedance changes and generates output signals that may be used to provide an indication of tracking of the several rotor blades to a pilot, while the craft is in flight.

Figure 2:
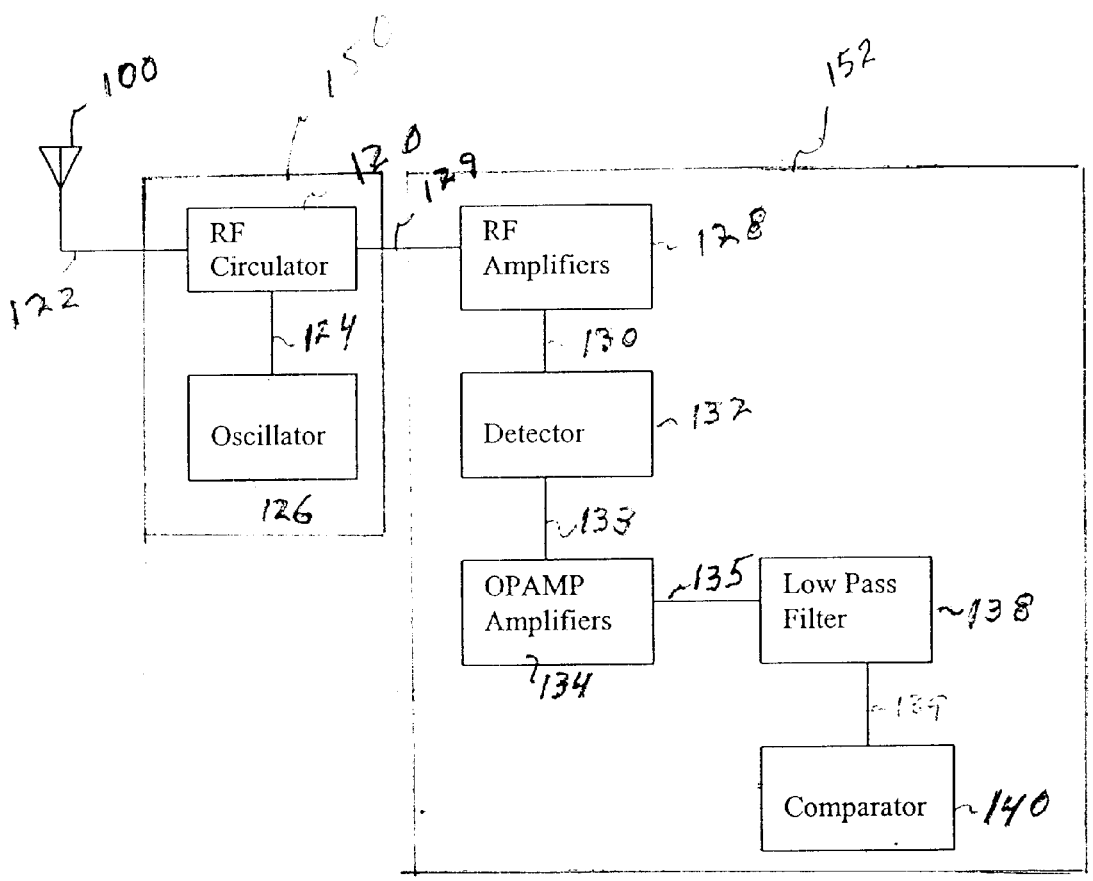
FIG. 2 is a circuit diagram representation of an illustrative embodiment of circuitry for the blade tracking device in accordance with the invention.

Referring now to FIG. 1 and FIG. 2, FIG. 2 shows an antenna 100, such as may be disposed within the radome 60, for detecting movement of an object, such as one of the rotating helicopter blades 54, and is preferably positioned in alignment with the path of travel of the tips 55 of the rotor blades 54. Further shown in FIG. 2 is a block diagram of electrical circuitry 150 connected to the antenna 100. The circuit 150 is designed for generating and transmitting a radio frequency (e.g., 1800 MHZ) signal to antenna 100 and includes a directional coupler such as a well-known RF circulator 120. The circulator 120 is connected to the antenna 100 by a conductor 122 and is connected via a conductor 124 to a standard RF source oscillator 126. The output impedance of the circulator 120 presented to the oscillator 126 is preferably a near perfect 50 Ohms, resulting in a return loss, in practice, of approximately 40 dB below the power level transmitted by the oscillator.

Any object that passes through the field of the antenna will modulate the transmitted carrier. The modulation frequency will be directly proportional to the rate at which the object enters and leaves the antenna field and- the modulation amplitude will be directly proportional to the distance between the antenna and the object. A transfer function can be calibrated in a well-known fashion to produce a corresponding curve. An appropriate equation can readily derived from the calibration data and used in the computer 146 to calculate blade distance from the antenna 100. Furthermore, the detected modulation phase data can also be used to calculate distance, in a known fashion. Known phase detectors resolve phase down to one degree. For distances greater than one wavelength, the amplitude of the received signal is used as an indication of the number of full wavelength between the object, e.g. a rotor blade, and the antenna. The phase signal can be used to determine the distance represented by any partial wavelength.

The circuit 152 is provided for detecting modulations in antenna impedance as one of the rotor tips 55 passes through the field of the antenna 100. An RF amplifier 128 is connected to circulator 120 via conductor 129. The amplitude signal to the RF amplifier 128 is approximately 40 dB less than the transmit amplitude to the antenna 100. When an object, i.e., the tip of a rotor blade, passes through the field of the antenna, causing a change in the field of the antenna, a change in the return loss from the 40 dB level will occur. When the object leaves the field, the return loss seen at the oscillator 126 will return to the steady state level of approximately 40 dB. The amplitude of the variation in return loss is a function of the size of the object and of the material of which the object is made, as well as a function of the strength of the radiated field and the distance of the object from the antenna. Additionally, the object causes a phase modulation of the return signal as the object moves through the field of the antenna.

In the illustrative embodiment of FIG. 2, the circulator 120 is further connected to a radio frequency (RF) amplifier circuit 128 via conductor 129. By operation of the circulator 120, a signal is transmitted from the oscillator 126 to the antenna and from the antenna to the RF amplifier 128. An amplified signal is transmitted from the RF amplifier 128 via conductor 130 to a signal detector 132. The signal detector 132 provides an output signal only when the input signal on conductor 130 has a signal level greater than a predetermined threshold level. By proper selection of the parameters of the amplifier 128 and the detector 132, a change in antenna impedance caused by movement of an object, such as rotating helicopter blade, in the vicinity of the antenna will be indicated by an output signal from detector 132 on conductor 133. An operational amplifier 134 connected to conductor 133 provides an amplified detector output signal that is transmitted to a low pass filter 138 via conductor 135. Operational amplifier 134 preferably consists of operational amplifiers with a total gain on the order of 50 dB. The RF amplifier 128 preferably has a minimum gain of approximately 40 dB.

The low pass filter 138 serves to eliminate noise signals outside of the radio frequency range and provides an input signal to an analog circuit 140 via conductor 139. The analog circuit 140 may, for example, be a well-known circuitry that provides a square wave output pulse in response to each signal from the filter 138 indicative of a rotor blade passing through the field of the antenna. The width of the analog circuit output pulse is directly proportional to the width of the rotor blade passing through the antenna field and the amplitude of the analog circuit output pulse will be directly proportional to the distance between the antenna and the object. The analog circuit 140 is connected via conductor 145 to a logic circuit 146. The logic circuit 146 may be a computer or other well-known circuitry, commonly used in helicopters and the like, for computing a balancing solution. Logic circuit 146 is responsive to output signals from the analog circuit 140 to provide an output signal representative of the distance of the track of a blade from a predefined level. The output of the logic circuit 146 may be used to compute a balancing solution for adjusting balancing weights or trim tabs for the individual blades to improve tracking, in a manner well-known to those skilled in the art.

Shown in FIGS. 3 through 6 is a dual antenna structure for use as a blade tracker, such as may be contained in the radome 60, shown in FIG. 1. The blade tracker may use such a dual antenna structure. The methodology for measuring the distance of a moving object such as a rotor blade from a specific point using two detector is well known to those skilled in the art and has been described in prior patents such as U.S. Pat. No. 3,023,317 issued Feb. 7, 1962, in the name of S. P. Willits, et al. and U.S. Pat. No. 4,812,463 issued Mar. 14, 1989, in the name of Richard Talbot. The noted prior art patents relate to the use of optical devices to determine proper tracking and describe methodology for determining distance from a fixed point of objects moving at a known velocity. The method involves the use of two spaced-apart detectors extending at a predefined angle with respect to each other and directed to the path of travel of the objects. Assuming that the rotor rotates at a known speed, the distance of the several blades from the antenna can be mathematically determined from the difference in time of detection at the two separate detectors. The two antennas of FIGS. 3 through 6 radiate in the direction of the moving rotor blade or the like at pre-defined angles to allow for the computation of the distance of the track of the moving object from a fixed reference point. The power required at the antenna is a function of the approximate distance of the path the from the antenna. A transmit power of approximately 50 milliwatts into the antenna has proven to be effective at a distance of approximately 20 feet. The power required, for example, at 4 feet has been found to be on the order of 20 dB less than the transmit power at 20 feet. The transmit frequency is a factor essentially only of the availability of the components, costs and antenna size. In one particular embodiment, the selected frequency is 1.803 GHz.

Antenna gain can be readily adjusted by selecting the antenna type and size. In a practical helicopter installation, the size is a key factor since the antenna is typically located external to the helicopter fuselage. In one specific embodiment, two antennas are directed such that the angle between the beams from the two antennas is approximately 13 degrees. Antenna impedance directly influences the system sensitivity, since motion is detected from an amplitude modulation of the return signal resulting from changes in the impedance of the field of the antenna. The antenna impedance is preferably closely matched to 50 Ohms, ideally within 0.5 Ohms. Sensitivity of the system is determined by a proper matching of impedance and has a bearing on the range and transmit power requirements of the system. The percentage of the amplitude modulation of the return signal may be increased by increasing the transmit power or increasing sensitivity and gain of the receiving circuitry. An antenna bandwidth of 30 MHZ has found to be adequate. The transmit frequency is preferably in the range of 1 GHz to 7 GHz. In a particular embodiment of the invention, the amplifier 128 has a noise figure of approximately 3.3 dB and a gain of approximately 1.0 dB.

FIG. 3 is a plan view of a circuit board 200 supporting a blade tracker antenna structure in accordance with the invention and adapted to be mounted within the radome 60. FIG. 4 is a side elevational view of the circuit board of FIG. 3. As shown in FIG. 4, a ground plane 208 is attached to the underside of the printed circuit board 206. Further shown in FIG. 4 is a connector block 212, by which the center feed 104 is provided. The tuning capacitor 210 has a further connection to the ground plane 208 at 215, as shown in FIG. 4. The antenna structure comprises two spaced apart antennas in the form of copper layers 201, 202 disposed on the printed circuit board 200. The copper layers 201, 202 each measure approximately 1.5" square. An antenna feed connection 204 provides a connection from two separate RF circulators 120 (shown in FIG. 2) to the two separate antennas. The circulator transmits signals to the associated of the antennas 201, 202, and receives signals from one of the antennas 201, 202. The antennas 201, 202 are mounted on a fiber glass printed circuit board 206. Further shown on the circuit board 200 is a tuning capacitor 210 used to tune the two antennas in a well-known fashion. Capacitor 210 is shown to be connected to the copper layer 202 by conductor 211.

Figure 5:
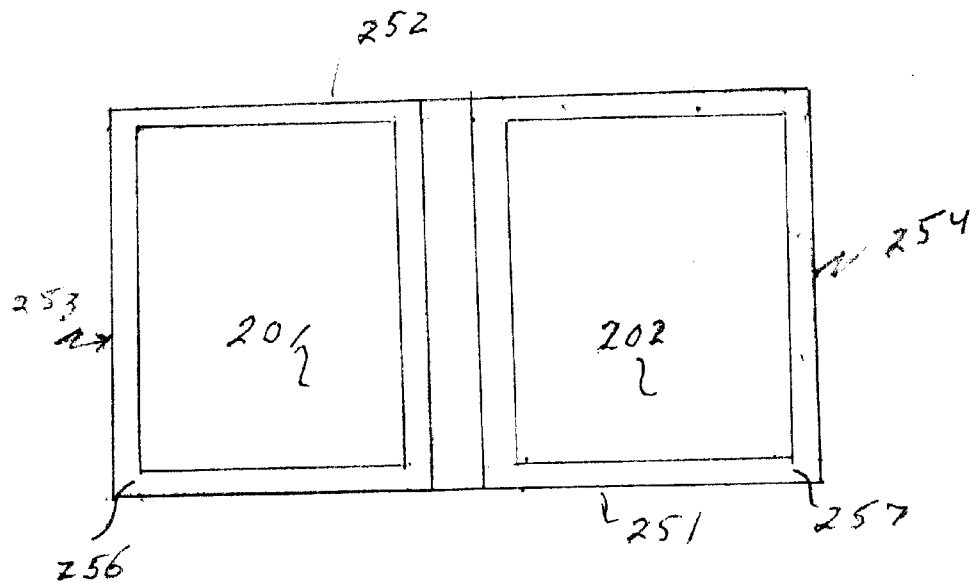
FIG. 5 is a plan view of a dual antenna structure for use in a dual position tracking arrangement.
Figure 6:
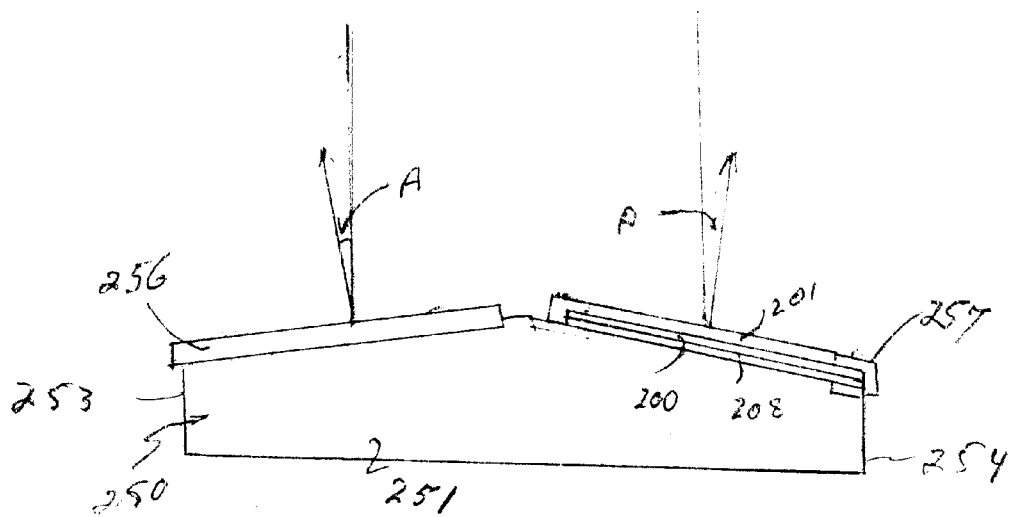
FIG. 6 is a partial cut-away front elevational view of the antenna structure of FIG. 5.

FIG. 5 is a plan view showing the antenna structure of FIGS. 3 and 4 in a support housing structure 250. FIG. 6 is partial cut-away frontal elevational view of the structure of FIG. 5. The support structure 250 has front and rear walls 251, 252 and side walls 253, 254. Brackets 256, 257 retain the two antennas 201, 202 on the structure. As shown in FIG. 6, the two antennas are each disposed at an angle A from vertical to aid in distance calculations as described in the above-referenced U.S. patents. A preferred angle is defined by the distance of the antenna from the plane of the rotor and the desired spacing between two measurement locations in the plane of the rotor. In one embodiment, the angle is approximately 6.5 degrees from a line extending perpendicularly to the plane of the rotor. It will be understood that the above-described arrangement is merely illustrative of the application of the principles of the invention and other arrangements may be deemed by those skilled in the art without departing from the scope of the invention as defined by the appended claims.

The embodiment of the invention in which an exclusive property or privilege is claimed are defined as follows:

1. Apparatus for detecting movement within a predefined spatial area of a selected blade of a rotating unit having a plurality of blades, said apparatus comprising:

an antenna disposed at a fixed position adjacent said spatial area and having a predetermined antenna impedance;

a signal source connected to said antenna for transmitting a radio frequency signal to said antenna, said antenna responsive to said radio frequency signal to radiate energy in said predefined spatial area;

detection circuitry connected to said antenna for detecting deviation in said antenna impedance from said predetermined antenna impedance resulting from the movement of said selected blade in said spatial area;

circuitry operating in synchronism with said rotating unit for generating a periodic signal; and circuitry responsive to said deviations in said antenna impedance and to said periodic signal for generating output signals indicative of distance of said selected blade from said antenna.

2. The apparatus in accordance with claim 1, wherein said antennae comprises a substantially flat metallic layer disposed on one side of a substrate.

3. The apparatus in accordance with claim 2, and further comprising a ground plane formed of a metallic layer disposed on an other side of said substrate, opposite said one side.

4. Apparatus for determining distance of a moving object from a fixed position, the apparatus comprising:

a first and second antennas disposed at said fixed position and each having a predetermined antenna impedance;

a signal source connected to said first and second antennas for transmitting a radio frequency signal to said antennas causing said antennas to radiate energy in first and second predefined antenna fields; and circuitry connected to said antennas for detecting changes in said predefined antenna impedance of said first and second antennas resulting from the presence of said object in said first and second predefined antenna fields, respectively, and for generating an output signal indicative of distance of said object from said fixed position.

5. Tracking apparatus for determining a path of travel of each of a plurality of blades of a moving rotor, the apparatus comprising:

a first antenna disposed at a first fixed position adjacent said rotor and a second antenna disposed at a second fixed position adjacent said rotor, each of said antennas having a predefined antenna impedance;

a signal source connected to said first and said second antennas for transmitting radio frequency signals to said antennas, said antennas responsive to said radio frequency signals to radiate energy in predefined antenna fields adjacent said rotor; and circuitry connected to said antennas for detecting changes in said predefined antenna impedance of said first and second antennas resulting from the presence of one of said blades in said predefined antenna fields and for generating an output signal indicative of distance from said antenna of a propeller blade traversing said antenna fields.

6. The tracking apparatus in accordance with claim 5, wherein said rotor and said antennas are mounted on an aircraft and said circuitry is operative to generate a separate output signal for each of said rotor blades indicative of distance of each of said rotor blades from said antennas, whereby an indication of tracking of said rotor blades relative to each other is generated.

7. Tracking apparatus, for determining a path of travel of each of a plurality of blades of a moving rotor, the apparatus comprising:

an antenna having a predefined antenna impedance and disposed adjacent said rotor;

a signal source connected to said antenna for transmitting radio frequency signals to said antenna, said antennas responsive to said radio frequency signals to radiate energy in a predefined antenna field adjacent said rotor; and circuitry connected to said antenna for detecting changes in said predefined antenna impedance resulting from the presence of one of said blades in said predefined antenna field and for generating an output signals indicative of distance from said antenna of a propeller blade traversing said antenna fields.

8. The tracking apparatus in accordance with claim 7, wherein said antenna comprises first and second metallic layers disposed side-by-side and spaced apart on a printed circuit board disposed on a helicopter provided with a rotor having a plurality of rotor blades moving along a predefined path of travel, said circuit board disposed in alignment with said path of travel.

9. The antenna in accordance with claim 8, herein the circuit board is disposed within a radome.

10. Apparatus for determining the path of travel of each of a plurality blades of a helicopter rotor moving a path of travel, the apparatus comprising:

an antenna disposed adjacent said path of travel and having a predetermined antenna impedance;

a signal source connected to said antenna for transmitting a radio frequency signal to said antenna;

said antenna responsive to said radio frequency signal to radiate energy in a predefined antenna field extending over said path of travel; and detection circuitry connected to the antenna for detecting changes in said predefined antenna impedance resulting from the presence of one of said helicopter blades in said path of travel; and circuitry responsive to said detected changes to compute a distance of said one of said helicopter blades from said antenna.

11. The apparatus in accordance with claim 10, wherein said detection circuitry detects changes in phase and amplitude of said signal and said circuitry responsive to said detected changes in phase and amplitude comprises circuitry for computing said distance.

12. Apparatus for determining separation of moving objects traveling along a predefined path of travel in a predefined spatial area, the apparatus comprising:

a first antenna having a predetermined antenna impedance and disposed at a first position adjacent said path;

a second antenna having a predetermined antenna impedance and disposed at a second position adjacent said path and spaced apart from said first position by a predefined distance;

a signal source connected to said first and second antennas for transmitting radio frequency signals to said antennas;

said first and second antennas responsive to said radio frequency signals to radiate energy in said predefined spatial area;

detection circuitry connected to said first and second antennas for detecting deviations in impedance of said first antenna from said predetermined antenna impedance of said first antenna and deviations in impedance of said second antenna from said predetermined impedance of said second antenna resulting from the movement of said object along said predefined path and for generating first and second output signals representative of said deviations in impedance of said first and second antennas, respectively; and circuitry connected to said detection circuitry and responsive to said first and second output, signals to generate timing signals representative of time of entry and time of exit of said objects.

13. The apparatus in accordance with claim 12 and further comprising computational circuitry responsive to said timing signals for determining spatial separations between objects of said plurality of objects.

14. The apparatus in accordance with claim 12 and further comprising timing apparatus responsive to said timing signals.

15. A sensing apparatus for determining the vibration characteristics of a series of fan blades traveling in a predetermined spatial area, said apparatus comprising:

an antenna disposed at a fixed position adjacent said spatial area and having a known intrinsic antenna impedance;

a signal source connected to said antenna for transmitting a radio frequency signal to said antenna, said antenna responsive to said radio frequency signal to radiate energy in said spatial area;

detection circuitry connected to said antenna for detecting deviation in said antenna impedance from said intrinsic antenna impedance resulting from movement of each of said fan blades in said spatial area and for generating a plurality of distance output signals, each indicative of distance of one of said blades from a predetermined position.

16. The circuitry in accordance with claim 15 wherein the detection circuitry further comprises circuitry responsive to said distance output signals for comparing said distance output signals and for identifying distance output signals differing from a predefined signal value by more than specified amount, whereby excessive vibration of a fan blade of said plurality of fan blades may be detected.

17. The circuitry in accordance with claim 16 wherein each of said distance output signals has a predefined distance output signal value and the predefined output signal value is an average value of said distance output signal values.

18. Apparatus for detecting movement of an object in a predefined spatial area, said apparatus comprising:

an antenna comprising a substantially flat metallic layer and disposed at a fixed position adjacent said spatial area and having a predetermined antenna impedance;

a signal source connected to said antenna for transmitting a radio frequency signal to said antenna, said antenna responsive to said radio frequency signal to radiate energy in said predefined spatial area; and detection circuitry connected to said antenna for detecting deviation in said antenna impedance from said predetermined antenna impedance resulting from the movement of said object in said spatial area.

* * * * *

UNITED STATES PATENT AND TRADEMARK OFFICE
CERTIFICATE OF CORRECTION

PATENT NO.    : 6,448,924 B1
DATED         : September 10, 2002
INVENTOR(S)   : Hafer, John W., Jr.

It is certified that error appears in the above-identified patent and that said Letters Patent is hereby corrected as shown below:

Column 7,
Line 42, please delete the comma after the number "1";
Line 43, "antennae" and substitute therefore -- antenna --.
Line 47, please delete the comma after the number "2";

Column 8,
Line 16, please delete the comma after the number "5";
Line 23, please delete the comma after the word "apparatus";
Line 46, please delete the comma after the number "8";
Line 46, please delete the "herein" and substitute therefore -- wherein --;
Line 66, please delete the comma after the number "10";

Signed and Sealed this

Twenty-second Day of April, 2003

JAMES E. ROGAN
*Director of the United States Patent and Trademark Office*